April 3, 1951 K. A. K. JESSEN 2,547,580
VEHICLE BODY AND RUNNING GEAR SUPPORT
Filed Feb. 17, 1948 2 Sheets-Sheet 1

Inventor.
Rej Arne Kristian Jessen

April 3, 1951     K. A. K. JESSEN     2,547,580
VEHICLE BODY AND RUNNING GEAR SUPPORT
Filed Feb. 17, 1948     2 Sheets-Sheet 2

Inventor:
Kaj Arne Kristian Jessen

Patented Apr. 3, 1951

2,547,580

UNITED STATES PATENT OFFICE 2,547,580

VEHICLE BODY AND RUNNING GEAR SUPPORT

Kaj Arne Kristian Jessen, Vanløse, Denmark

Application February 17, 1948, Serial No. 9,298
In Denmark February 13, 1947

9 Claims. (Cl. 280—113)

The present invention relates to an improvement in the construction of vehicles, particularly to the construction of an undercarriage in horse-drawn vehicles and in trailers.

The object of the present invention is to provide a light and rigid construction of the means for supporting the vehicle body to the wheel shaft. Another object of the invention is to provide such a light and rigid construction in connection with an undercarriage that is rotatable on a kingpin, and in which the stresses due to a load off-centre upon the vehicle body are not accumulated in the kingpin, which is thus not subjected to such strains that cause it to bend or break.

Figure 1:
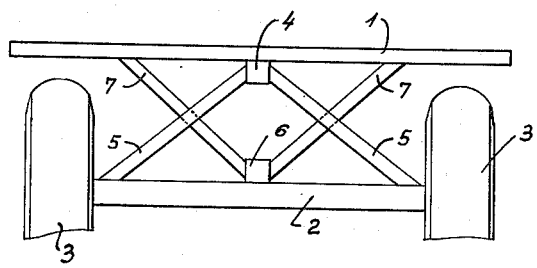

The invention is further explained in the following description with reference to the accompanying drawing, in which Fig. 1 is a schematic front elevation of a simple construction of an undercarriage rigidly attached to the vehicle body, Fig. 2 a similar view of an undercarriage rotatably attached to the vehicle body, Fig. 3 a modified manner of construction of a rotatable undercarriage, Fig. 4 the undercarriage of Fig. 3 in top elevation, Fig. 5 another modification of an undercarriage in front elevation, Fig. 6 a side elevation of the undercarriage shown in Fig. 5 and Fig. 7 a top elevation of same.

Referring to the drawing, the same numerals are employed to indicate like members in the several figures. Thus 1 indicates the body of a vehicle, 2 is an axle disposed at some distance below the vehicle body, and 3 indicates the wheels mounted for rotation on the axle journals.

With particular reference to Fig. 1, a support 4 is rigidly attached to the lower side of the vehicle body 1 in the longitudinal center line thereof above the wheel axle 2. This support 4 is by means of struts 5 braced in relation to the ends of the axle 2 thus transmitting the thrust exerted by any load in the vehicle directly to the wheel axle 2. Below this support 4 is arranged another support 6 rigidly attached to the axle 2 midways between the wheels and braced in relation to the vehicle body 1 by means of struts 7 that are attached to the vehicle body at a substantial distance from the support 4 towards the lateral edges of the vehicle body. In this manner the vehicle is provided with a rigidly attached undercarriage for instance for the rear wheels of the vehicle, which undercarriage is adequately braced in relation to the vehicle body for absorbing any stresses incurred by a load more or less off center.

Figure 2:
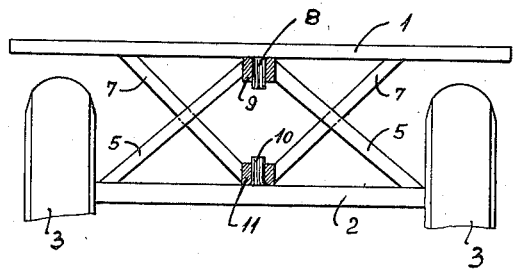

For providing a rotatable undercarriage, for instance a forecarriage, the support attached to the vehicle body 1 comprises as shown in Fig. 2 a kingpin 8 rigidly attached to the vehicle body and provided with an annular turnplate member 9 rotatable thereon. This turnplate member 9 is braced in relation to the ends of the axle 2 by means of struts 5. Coaxially to the kingpin 8 an auxiliary kingpin 10 is attached to the axle 2 and carries an annular turnplate member 11 which is braced in relation to the vehicle body 1 by means of inclined struts 7 in the manner described in connection with Fig. 1.

Figure 3:
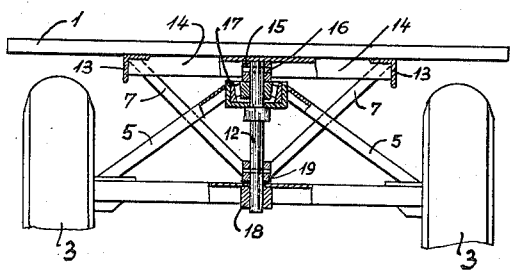
Figure 4:
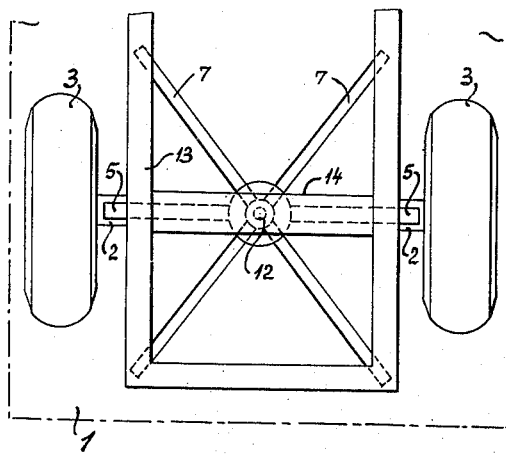

As shown in Fig. 3 the kingpin 8 and the auxiliary kingpin 10 of the construction shown in Fig. 2 may be replaced by a single kingpin 12 connecting the upper and lower supports to each other. In this instance a bolster frame 13 is attached to the lower surface of the vehicle body 1, its sides running parallel to the ends and sides of the vehicle body. This frame has a transverse brace 14 in the centre of which is attached a bearing 15, preferably a ball thrust bearing, the one part of which is rigidly attached to the brace 14 and accommodates the upper end of the kingpin 12 which by suitable means, for instance a cotter 16, is connected to the rigid bearing member. The rotatable bearing member 17 is braced in relation to the ends of the wheel axle 2 by means of struts 5. The lower support comprises a bearing 18 formed in the centre of the wheel axle 2 coaxial to the ball bearing 16, 17. This bearing 18 accommodates the lower end of the kingpin 12 to which is attached an annular member 19 that is braced in relation to the lateral edges of the bolster frame 13 by means of struts 7. In this manner is provided a well braced rotatable undercarriage provided with a kingpin interconnecting the upper and lower supports and well braced at either end. The angle of rotation is limited by the relative position of the struts 5 and 7.

Figure 5:
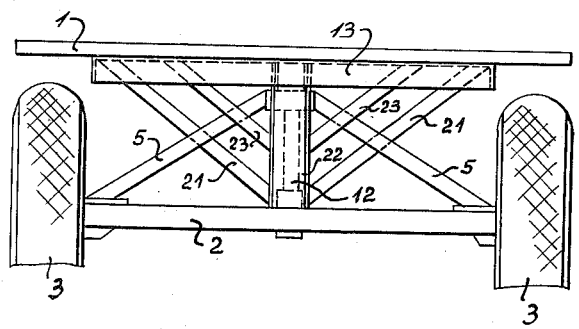
Figure 6:
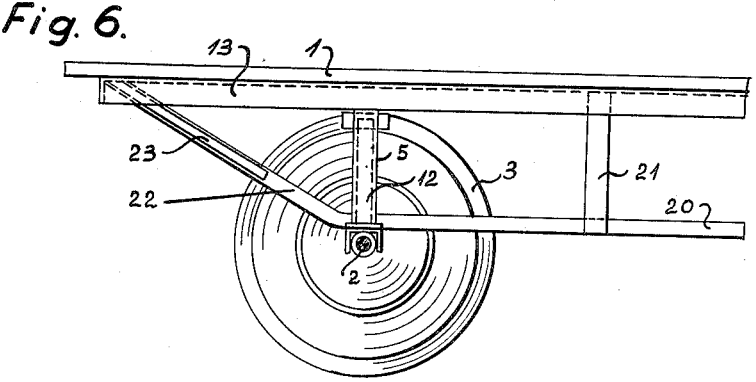
Figure 7:
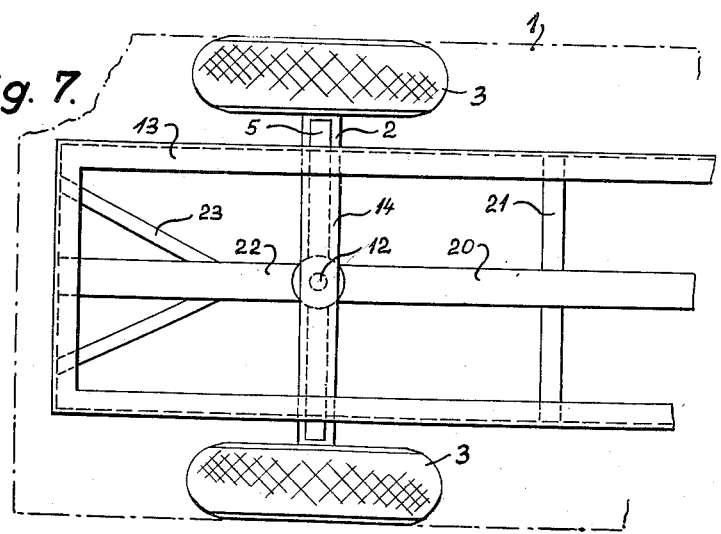

In vehicles provided with a rotatable forecarriage and a rigid rear carriage according to the present invention, the lower supports may be interconnected by means of a perch 20, Fig. 6 which perch is braced in relation to the bolster frame 13 by means of a number of pairs of struts 21, only a single pair of which is seen in Figs. 5-7. As an elongation of the perch 20 the lower support of the foremost as well as the rearmost undercarriage is furthermore braced by an inclined strut 22 extending from the support in question to the respective end of the bolster frame. This strut may be laterally braced in relation to the end part of the bolster frame by means of stays 23.

It will be understood that the above described constructions shall serve as examples only, and that combinations of the various arrangements will fall within the scope of the invention, and that variations of details are possible to comply with peculiarities of the vehicle in connection with which the device is to be utilized.

I declare that what I claim and desire protected by Letters Patent is:

1. In a vehicle, a transverse axle; wheels carried by said axle; a vehicle body; a first set of struts bearing with their upper ends on the underside of said vehicle body at substantially its longitudinal center line and bearing with their lower ends on generally the longitudinal end portions of said axle; and a second set of struts bearing with their upper ends on the underside of said vehicle body at points at a substantial distance from the longitudinal center line of the vehicle and bearing with their lower ends on said axle at substantially the longitudinal center thereof.

2. In a vehicle, a transverse axle; wheels carried by said axle; a vehicle body; a first set of struts; pivot means connecting the upper ends of said struts to the underside of said vehicle body for rotation about a vertical axis, the said pivot means being disposed at the longitudinal center line of the vehicle; means for connecting the lower ends of said struts rigidly to generally the longitudinal end portions of said axle; a second set of struts rigidly connected at their upper ends to the underside of said vehicle frame at points at a substantial distance from the longitudinal center of the vehicle; and pivot means connecting the lower ends of the latter struts to said axle for rotation about a vertical axis, the latter pivot means being disposed at the longitudinal center of said axle and in vertical alignment with said pivot means of said first set of struts.

3. In a vehicle an arrangement constructed in accordance with claim 2 wherein each of said pivot means is constituted by a stationary pivot pin and bearing sleeve rotatable about said pivot pin and wherein the corresponding set of struts is secured to said sleeve.

4. In a vehicle, a transverse axle; wheels carried by said axle; a vehicle body; a single spindle disposed vertically and having its upper end rigidly secured to the underside of said vehicle body; means for rotatably securing the lower end of said spindle to the longitudinal center of said axle; a first set of struts having its upper ends rigidly connected to the underside of said vehicle body at points at a substantial distance from the longitudinal center of the vehicle and having its lower ends rigidly connected to said spindle in proximity to said securing means for the lower end thereof; a second set of struts having their lower ends connected to said axle at generally the longitudinal end portions thereof; and cooperating bearing means disposed on said spindle in proximity to the upper end thereof for securing the upper ends of said second set of struts to said spindle for revolving about the spindle as axis of rotation.

5. In a vehicle, a transverse axle; wheels carried by said axle; a vehicle body; an underframe fixedly mounted on said vehicle body; a first set of struts bearing with their upper ends on the underframe of said vehicle body at substantially its longitudinal center line and bearing with their lower ends on generally the longitudinal end portions of said axle; and a second set of struts bearing with their upper ends on the underframe of said vehicle body at points at a substantial distance from the longitudinal center line of the vehicle and bearing with their lower ends on said axle at substantially the longitudinal center thereof.

6. In a vehicle, a transverse axle; wheels carried by said axle; a vehicle body; an underframe fixedly mounted on said vehicle body; a single spindle disposed vertically and having its upper end rigidly secured to the underframe of said body; means for rotatably securing the lower end of said spindle to the longitudinal center of said axle; a first set of struts having its upper ends rigidly connected to the underframe of said vehicle body at points at a substantial distance from the longitudinal center of the vehicle and having its lower ends rigidly connected to said spindle in proximity to said securing means for the lower end thereof; a second set of struts having their lower ends connected to said axle at generally the longitudinal end portions thereof; and cooperating bearing means disposed on said spindle in proximity to the upper end thereof for securing the upper ends of said second set of struts to said spindle for revolving about the spindle as axis of rotation.

7. In a vehicle, a transverse axle; wheels carried by said axle; a vehicle body; a single spindle disposed on the underside of said vehicle in the longitudinal center line thereof for non-rotatably securing the upper end of said spindle to the underside of said vehicle body; means for rotatably securing the lower end of said spindle to the longitudinal center of said axle; a first set of struts having its upper ends rigidly connected to said vehicle body at points at a substantial distance from the longitudinal center of the vehicle and having its lower ends rigidly connected to said spindle in proximity to aid securing means for the lower end thereof; a second set of struts having their lower ends rigidly connected to said axle at generally the longitudinal end portions thereof; a bearing member disposed on said spindle in proximity to the upper end thereof; and a bearing sleeve rotatably cooperating with said bearing member, the said bearing sleeve being connected to the upper ends of said second set of struts so that the later struts are adapted for revolving about the spindle as axis of rotation.

8. In a vehicle, a transverse front axle; a transverse rear axle; wheels carried by each of said axles; a vehicle body; an underframe fixedly mounted on said vehicle body, the said underframe having a front portion and side portions; a perch extending at the longitudinal center of said vehicle, and connecting the said front and rear axles; a single spindle disposed vertically and having its upper end rigidly secured to the underframe of said body; means for rotatably securing the lower end of said spindle to the longitudinal center of said front axle; a first set of struts connecting the said perch to the side portions of said underframe; a stay connecting the said perch at its front end to the front portion of said underframe; a second set of struts having their lower ends connected to said front axle at generally the longitudinal end portions thereof; and cooperating bearing means disposed on said spindle in proximity to the upper end thereof for securing the upper ends of said second set of struts to said spindle for revolving about the spindle as axis of rotation.

9. In a vehicle, a transverse front axle; a transverse rear axle; wheels carried by each of said axles; a vehicle body; an underframe fixedly mounted on said vehicle body, the said underframe having a front portion and side portions; a perch extending at the longitudinal center of said vehicle, and connecting the said front and rear axles; a single spindle disposed vertically and having its upper end rigidly secured to the underframe of said body; means for rotatably securing the lower end of said spindle to the longitudinal center of said front axle; a first set of struts connecting the said perch to the side portions of said underframe; a stay connecting the said perch at its front end to the front portion of said underframe; a second set of struts having their lower ends connected to said front axle at generally the longitudinal end portions thereof; cooperating bearing means disposed on said spindle in proximity to the upper end thereof for securing the upper ends of said second set of struts to said spindle for revolving about the spindle as axis of rotation; and bracings for said stay, the said bracings extending laterally from said stay to said underframe.

KAJ ARNE KRISTIAN JESSEN.

REFERENCES CITED

The following references are of record in the file of this patent:

UNITED STATES PATENTS

| Number | Name | Date |
|---|---|---|
| 584,395 | McKnight | June 15, 1897 |
| 587,628 | Windle | Aug. 3, 1897 |
| 853,614 | Adams | May 14, 1907 |

FOREIGN PATENTS

| Number | Country | Date |
|---|---|---|
| 8,272 | Great Britain | Apr. 18, 1905 |